United States Patent [19]
Collins

[11] Patent Number: 5,605,564
[45] Date of Patent: Feb. 25, 1997

[54] MEMBRANE GAS DEHYDRATOR

[75] Inventor: D. Stephen Collins, Bridgton, Me.

[73] Assignee: Howell Laboratories, Inc., Bridgton, Me.

[21] Appl. No.: 599,983

[22] Filed: Feb. 14, 1996

[51] Int. Cl.$^6$ .................................................. B01D 53/22
[52] U.S. Cl. ......................... 95/52; 96/8; 34/416; 34/417; 34/73; 34/78
[58] Field of Search ................. 34/377, 402, 416–17, 34/405, 467, 487, 488, 492, 548, 566, 578, 73, 78; 55/212, 338; 96/8, 10; 95/19, 52

[56] References Cited

U.S. PATENT DOCUMENTS

| | | | |
|---|---|---|---|
| 4,475,293 | 10/1984 | Banerjee | 34/492 X |
| 4,883,023 | 11/1989 | Tsang et al. | 96/8 X |
| 4,935,143 | 6/1990 | Kopp et al. | 210/636 |
| 5,160,514 | 11/1993 | Newbold et al. | 96/8 |
| 5,187,972 | 2/1993 | DeFriez | 73/23.2 |
| 5,399,188 | 3/1995 | Roberts | 95/52 |

*Primary Examiner*—Henry A. Bennett
*Assistant Examiner*—Steve Gravini
*Attorney, Agent, or Firm*—Samuels, Gauthier, Stevens & Reppert

[57] ABSTRACT

A capillary membrane gas dehydrator. A gaseous stream having water vapor therein flows into the tube side of the capillaries. Water vapor permeates through the fibers to the shell side. A portion of the dehydrated stream is used as a purge stream for the shell side of the dehydrator. A pressure valve meter combination is used in the bypass stream to ensure that the pressure of the purge stream is maintained at a constant level independent of any variation in the pressure of the feed stream. This ensures that if there is an increase in pressure in the feed stream there is no increase in the purge rate and no corresponding increase in purge losses.

4 Claims, 1 Drawing Sheet

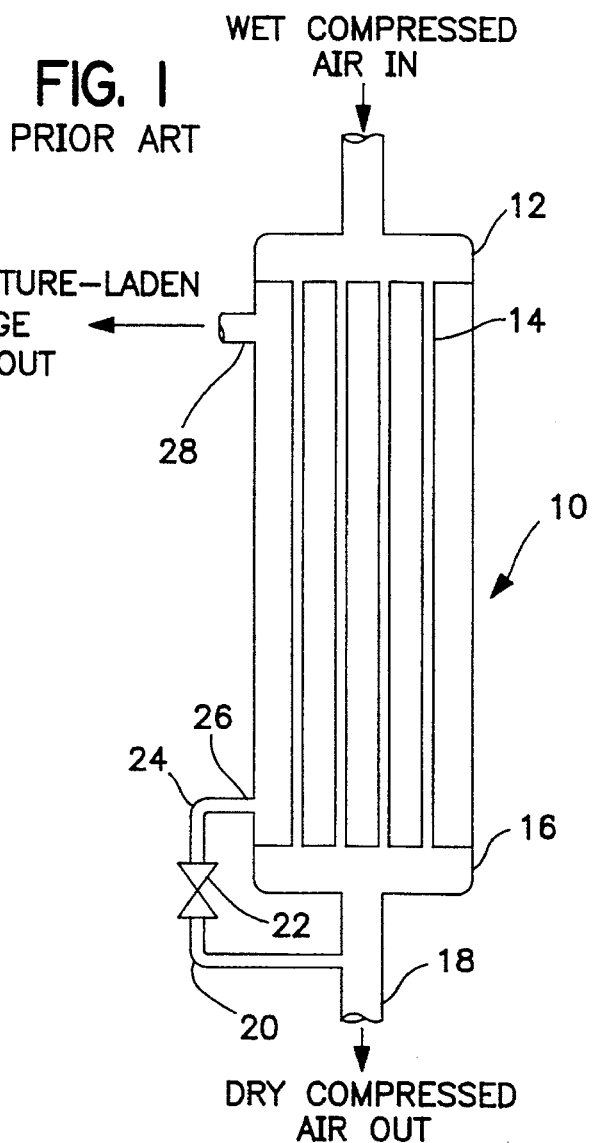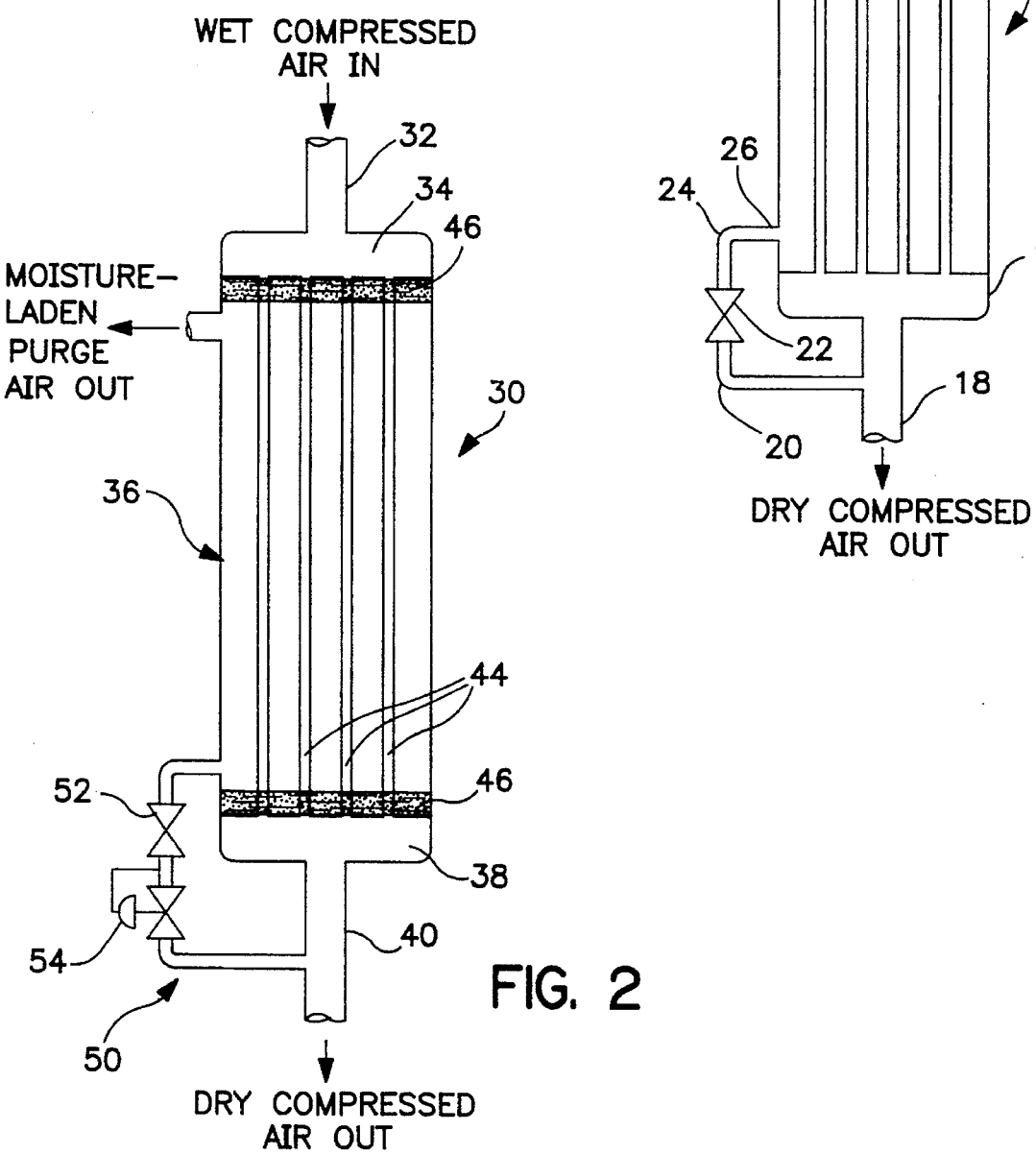

MEMBRANE GAS DEHYDRATOR

FIELD OF THE INVENTION

The invention relates to a membrane gas (air) dehydrator.

BACKGROUND AND BRIEF SUMMARY OF THE INVENTION

In many process applications, the dew point of air in a particular environment must be closely controlled below a predetermined level. For example, in pneumatically operated fluidic systems, particularly fluidic control systems, if the dew point of the pneumatic air is reached or exceeded, the condensed water can adversely affect the finely tuned pneumatic elements. In a radio frequency environment where RF energy is being pumped through a coaxial cable or a waveguide, water vapor can cause arcing which dissipates energy and causes degradation of the circuits.

Of the various systems available in the prior art to control the dew point of a gas, particularly air, below a certain level, one such system is a membrane gas dehydrator. The invention disclosed herein is an improved membrane gas dehydrator.

FIG. 1 is a schematic of a prior art membrane gas dehydrator shown generally at 10 such as would be used for removing vapor from a compressed air stream for a fluidic control system. Compressed air containing water vapor enters an inlet plenum 12 at an elevated pressure, P1. The moisture laden air then flows through the interior of a plurality of membrane capillary fibers 14. The fibers are constructed of a material with microscopic porosity. The size of the pores is carefully controlled to allow the passage of water molecules but to retard the passage of gas molecules for example, nitrogen and oxygen molecules, the major constituents of air.

At the far end of the fibers 14, water depleted gas enters an exit plenum 16 and then to the user's gas distribution system via conduit 18. The water molecules are driven through the membrane walls of the tubes 14 by the difference in water vapor pressure between the inside and outside of the fibers. The water vapor coalesces on the outside surface of the fibers. The water vapor which coalesces equalizes the internal and external water vapor pressure thereby slowing or stopping the drying process.

In order to remove the permeated water vapor from the external surface of the fibers 14 it is conventional to provide a sweep or purge flow of dry air from the outlet of the dehydrator outlet conduit 18. This basically is a bypass 20 which leads to a throttle valve 22 such as a "HOKE", Inc., Series 1600. The metered gas then flows through a conduit 24 to an inlet in the shell 26. The metered gas sweeps or purges the collected water vapor from the external surfaces of the fibers and exhausts it to the atmosphere via a vent port 28.

At a given operating pressure and inlet dew point temperature (water vapor content) the exit dew point of the gas will vary inversely with the purge flow rate. Thus, the user can adjust the purge flow rate until the user achieves the desired outlet dew point at the desired output flow rate. However, if the operating pressure is increased while the inlet dew point is held constant, the water vapor pressure is increased. Because the water vapor pressure is the force which causes water vapor to permeate through the fibers more water will permeate resulting in a lower exit dew point for a given exit flow rate and purge flow rate. However, because the purge flow rate is established by a fixed orifice, if the operating pressure is increased, the purge flow rate will likewise increase proportionately to the pressure increase. Because the desired exit moisture content had already been achieved at the lower purge flow rate set for the lower operating pressure this additional purge flow is wasted and represents a decrease in the efficiency of the dehydrator.

In the present invention, a pressure regulator is incorporated into the prior art bypass stream. The regulator is set to deliver a pressure somewhat lower than the lowest anticipated operating pressure and the throttle valve is adjusted to deliver the desired purge flow rate at that regulated pressure. If the operating pressure is increased, the purge flow rate will remain constant since the pressure at the throttle valve remains constant. Therefore, the efficiency of the dehydrator is not reduced by the increase in operating pressure.

The invention, in one aspect, embodies a membrane gas dehydrator with a housing having an inlet plenum and an exit plenum. An inlet is in communication with the inlet plenum and an outlet in communication with the exit plenum. A bundle of capillary membrane fibers are joined at their ends by common headers and are received in the housing. A fluid stream having water vapor therein flows under pressure $P_1$ into the tube side of the fibers as a permeate feed stream, while the water vapor permeates through the fibers to the shell side of the fibers forming a permeate-lean feed stream in the fibers and a permeate rich zone on the shell side fibers. A portion of the permeate-lean stream is bypassed from the exit plenum back to the shell side of the fibers to purge the water vapor from the shell side. A pressure regulating valve at pressure $P_2$ is upstream of a metering valve. $P_2$ is always lower than $P_1$ to ensure that if the operating pressure $P_1$ is increased, the purge flow rate will remain constant.

The invention, in another aspect, comprises a process for dehydrating a fluid stream and includes flowing a fluid stream containing water vapor into membrane capillary fibers under a pressure $P_1$, flowing the water vapor through the membrane walls to the shell side of the fibers to form a water vapor rich stream and a water vapor lean stream. The water vapor lean stream is discharged while bypassing a portion of the water vapor lean stream and introducing the bypassed portion of the stream as a sweep stream into the shell side of the fibers to absorb the water vapor therein discharging the sweep stream from the shell side of the membrane, and while maintaining the pressure of the sweep stream at a pressure $P_2$ which is lower than the inlet pressure of the feed stream $P_1$.

BRIEF DESCRIPTION OF THE DRAWINGS

FIG. 1 is an illustration of a prior art membrane dehydrator; and

FIG. 2 is an illustration of a membrane dehydrator of the invention.

DESCRIPTION OF THE PREFERRED EMBODIMENT(S)

Referring to FIG. 2, a system embodying the invention is shown generally at 30 and comprises an inlet 32 in communication with an inlet plenum 34, a cylindrical housing generally shown at 36, an exit plenum 38 and a discharge conduit 40. Received within the shell is a bundle of membrane capillary fibers 44, joined at their ends by headers 46. The outside of the fiber surfaces define a shell side while the inside of the fibers define a tube side. The permeate-lean dehydrated air flows through the discharge conduit 40. A bypass is shown generally at 50 and comprises a throttle or metering valve 52 and upstream of the metering valve is a pressure regulator 54.

The operation of the invention will be described with reference to the following non-limiting examples.

It is common practice to allow a compressor supplying compressed air to a pneumatic system to operate between preset pressure limits. Because the capacity of any gas to hold water vapor varies inversely with pressure, the water vapor content will be greatest at the minimum pressure. If the water vapor content of the air or gas must be limited, the dehydrator which controls the water vapor content must be capable of handling the water vapor load at the lower operating pressure.

As an example, if an air compressor is set to operate between 80 psig and 110 psig, the compressor's after cooler functions to provide a dewpoint of 60° F. at the dehydrator inlet 12. Operating requirements demand an air dewpoint of 20° F. out of the dehydrator outlet 18. The flow demand of the system is constant at 15 standard cubic feet per minute (SCFM).

With a given membrane dehydrator such as an "AQUAAIR" Inc., model 2040, it is empirically determined that, with an inlet dewpoint of 60° F. and an inlet pressure of 80 psig, a purge or sweep flow rate of 3 SCFM will maintain an outlet dewpoint of 20° F., the desired maximum moisture content.

In the prior art membrane dehydrator 10 as shown in FIG. 1, the throttle valve 22 is adjusted when the inlet pressure is 80 psig to provide the required 3 SCFM of purge or sweep flow.

Because the throttle valve is effectively a fixed orifice, if its inlet pressure is increased, its flow rate will vary essentially linear. Thus, if the pressure is increased to, say, 110 psig, the purge flow will increase by the ratio of 110:80, or from 3 SCFM to about 4.1 SCFM, a 36% increase in losses to purge.

As explained above, both the increase in operating pressure and the increase in purge flow rate will decrease effluent moisture content. Thus, in the prior art dehydrator, the increase in inlet pressure will result in a delivered dewpoint of −20° F. Since the system demands only a 20° F. dewpoint, there is in this case no value to the excess depression of dewpoint and losses to purge have increased 26%.

In the present invention, the pressure regulator 54 is adjusted to 70 psig, a pressure somewhat lower than the lowest supply pressure. The throttle valve 52 is adjusted to provide the required 3 SCFM purge flow to maintain the required 20° F. effluent dewpoint when the inlet pressure is 80 psig.

Now, if the inlet pressure is again increased to 110 psig, the regulator 54 will function to maintain the pressure at the throttle valve at 70 psig. There is no increase in purge rate and thus no increase in purge losses.

As explained above, the increase in supply pressure to the dehydrator results in an increase in dehydration effect. In this case, the effluent dewpoint will be about 1° F. This dewpoint is below the required upper limit of 20° F., but it was achieved with no increase in purge losses.

In another example, it was determined that a purge rate of 5 SCFM would maintain an effluent dewpoint of −50° F. at 8 SCFM net flow and 80 psig inlet pressure. In the prior art dehydrator, an increase in inlet pressure to 110 psig increases purge rate to about 7 SCFM, and reduces effluent dewpoint to below −70° F. Flow efficiency of the dehydrator in terms of net flow to gross flow is (8÷8+7) or 53%. In the present invention, effluent dewpoint also falls to −70° F., but flow efficiency remains unchanged at (8÷8+5) or 62%.

The foregoing description has been limited to a specific embodiment of the invention. It will be apparent, however, that variations and modifications can be made to the invention, with the attainment of some or all of the advantages of the invention. Therefore, it is the object of the appended claims to cover all such variations and modifications as come within the true spirit and scope of the invention.

Having described my invention, what I now claim is:

1. A membrane gas dehydrator which comprises:

a housing having an inlet plenum and an exit plenum;

an inlet in communication with the inlet plenum and an outlet in communication with the exit plenum;

a bundle of membrane capillary fibers joined at their ends by common headers;

means to flow a fluid feed stream having water vapor therein under pressure $P_1$ into the inlet plenum and into the tube side of the fibers while the water vapor permeates through the tubes to the shell side of the fibers forming a water vapor lean feed stream in the fibers and a water vapor rich zone on the shell side;

means to discharge the water vapor lean stream from the exit plenum;

means to discharge the water vapor from the shell; and means to bypass a portion of the permeate-lean stream from the exit plenum back to the shell side of the fibers to purge the water vapor from the shell side, said means to bypass comprising a pressure regulating valve at pressure $P_2$ upstream of a metering valve where $P_2$ is lower than $P_1$ to ensure that if the operating pressure is increased, the purge flow rate will remain constant.

2. A method for dehydrating a fluid stream which comprises:

flowing a fluid feed stream containing water vapor into membrane capillary fibers under a pressure $P_1$;

flowing the water vapor through the membrane walls to the shell side of the tubes to:

form a water vapor rich stream; and a water vapor lean stream;

discharging the water vapor lean stream;

bypassing a portion of the water vapor lean stream and introducing the bypassed portion of the stream as a sweep stream into the shell side to absorb the water vapor therein;

discharging the sweep stream from the shell side; and maintaining the pressure of the sweep stream at a pressure $P_2$ which is lower than the inlet pressure of the feed stream $P_1$.

3. The method of claim 2 which comprises:

maintaining the $P_2$ at a constant level independent of any variation in the pressure $P_1$.

4. The method of claim 2 which comprises:

maintaining the flow rate of the swept stream constant independent of any pressure variation of $P_1$.

* * * * *